United States Patent
Agrawal et al.

(10) Patent No.: US 9,832,300 B2
(45) Date of Patent: Nov. 28, 2017

(54) METHOD AND APPARATUS FOR CONTEXTUALLY MANAGING CONTACT PRIORITIES BASED ON TRAVEL

(71) Applicant: Motorola Mobility LLC, Chicago, IL (US)

(72) Inventors: Amit Kumar Agrawal, Bangalore (IN); Craig J Detter, Gurnee, IL (US); Mark A Rose, San Jose, CA (US)

(73) Assignee: MOTOROLA MOBILITY LLC, Chicago, IL (US)

( * ) Notice: Subject to any disclaimer, the term of this patent is extended or adjusted under 35 U.S.C. 154(b) by 0 days.

(21) Appl. No.: 14/961,322

(22) Filed: Dec. 7, 2015

(65) Prior Publication Data
US 2017/0163782 A1   Jun. 8, 2017

(51) Int. Cl.
H04M 3/42   (2006.01)
H04M 1/2745   (2006.01)

(52) U.S. Cl.
CPC ........... *H04M 1/274533* (2013.01); *H04M 1/274583* (2013.01); *H04M 3/42348* (2013.01)

(58) Field of Classification Search
CPC ..... H04M 1/274533; H04M 1/274583; H04M 3/42348
See application file for complete search history.

(56) References Cited

U.S. PATENT DOCUMENTS

| | | | |
|---|---|---|---|
| 8,380,209 B1 * | 2/2013 | Sylvain | H04M 3/42348 455/413 |
| 2006/0046768 A1 * | 3/2006 | Kirbas | H04M 1/274516 455/550.1 |
| 2010/0144331 A1 * | 6/2010 | Koberg | H04M 1/274583 455/418 |
| 2010/0245262 A1 * | 9/2010 | Vance | G06Q 10/107 345/173 |
| 2014/0295808 A1 * | 10/2014 | Ely | H04M 1/274583 455/414.1 |
| 2017/0099376 A1 * | 4/2017 | Agrawal | H04M 1/274533 |

OTHER PUBLICATIONS

Radu Mariescu-Istodor, "Detecting User Actions in MOPSI", University of Eastern Finland School of Computing Thesis, Sep. 26, 2013, 70 pages.

* cited by examiner

*Primary Examiner* — Ajit Patel

(57) ABSTRACT

A method and apparatus for contextually managing contact priorities based on travel includes an electronic device configured to determine a travel destination remote from a home location for the electronic device and to determine a set of individuals who will be located at the travel destination. The electronic device is further configured to temporarily make one or more contacts for the set of individuals preferred contacts while traveling and to enable a limited-interruption mode on the electronic device while traveling, wherein an audible alert on the electronic device is enabled for preferred contacts and disabled for non-preferred contacts while the limited-interruption mode is enabled.

20 Claims, 5 Drawing Sheets

| 502 — CONTACT ID | 504 — TYPE | 506 — DATA VALUE |
|---|---|---|
| 522 — 3822 / 524 | PERSONAL HOME / 526 | (415) 469-4378 / 528 |
| 532 — 3822 / 534 | PERSONAL CELL / 536 | (415) 473-8129 / 538 |
| 542 — 3822 / 544 | WORK PHONE / 546 | (415) 317-5000 EXT. 174 / 548 |
| 552 — 3822 / 554 | PERSONAL E-MAIL / 556 | steven318@gmail.com / 558 |
| 562 — 3822 / 564 | WORK E-MAIL / 566 | parker.s@electrodynamics.com / 568 |
| 572 — 3822 / 574 | PERSONAL WEBSITE / 576 | www.facebook.com/steven.parker / 578 |
| 582 — 3822 / 584 | PROFESSIONAL WEBSITE / 586 | www.linkedin.com/steven.parker / 588 |

FIELDS

RECORDS

METHOD AND APPARATUS FOR CONTEXTUALLY MANAGING CONTACT PRIORITIES BASED ON TRAVEL

FIELD OF THE DISCLOSURE

The present disclosure relates generally to an electronic device managing contact priorities and more particularly to the electronic device temporarily modifying contact characteristics based on travel.

BACKGROUND

Modern electronic computing devices are being programmed with sophisticated software and firmware, which allows users of those devices to specify certain events or times during which they should not be disturbed by the devices. This, however, makes the users less accessible and less likely to receive important communications in an acceptable time frame.

BRIEF DESCRIPTION OF THE FIGURES

The accompanying figures, where like reference numbers refer to identical or functionally similar elements throughout the separate views, form part of the specification and illustrate embodiments in accordance with the included claims.

FIG. 5 shows a contact on an electronic device, in accordance with some embodiments.

Figure 1:
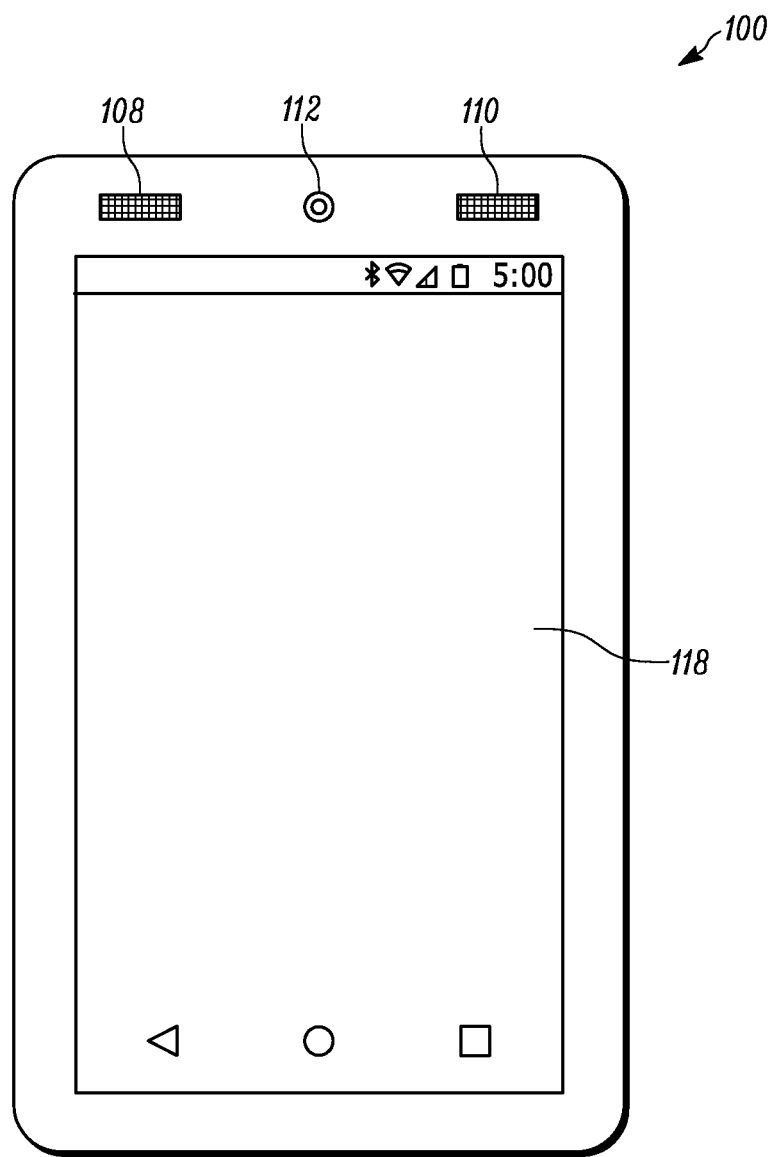
FIG. 1 shows an electronic computing device, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present teachings. In addition, the description and drawings do not necessarily require the order presented. It will be further appreciated that certain actions and/or steps may be described or depicted in a particular order of occurrence while those skilled in the art will understand that such specificity with respect to sequence is not actually required.

The method and device components have been represented, where appropriate, by conventional symbols in the drawings, showing only those specific details that are pertinent to understanding the embodiments of the present teachings so as not to obscure the disclosure with details that will be readily apparent to those of ordinary skill in the art having the benefit of the description herein.

DETAILED DESCRIPTION

Generally speaking, pursuant to various embodiments described herein, the present disclosure provides a method and device for managing contact priorities on an electronic device. More specifically, an electronic device temporarily modifies contact characteristics based on travel. While a user of an electronic device is traveling, contacts for individuals traveling with the user or located at the user's travel destination can have elevated importance. The characteristics of the contacts are modified to make the user more accessible to the individuals during the travel.

In accordance with the teachings herein, a method performed by an electronic device for contextually managing contact priorities based on travel includes determining a travel destination remote from a home location for the electronic device and determining a set of individuals who will be located at the travel destination. The method further includes temporarily making one or more contacts for the set of individuals preferred contacts while traveling and enabling a limited-interruption mode on the electronic device while traveling, wherein an audible alert on the electronic device is enabled for preferred contacts and disabled for non-preferred contacts while the limited-interruption mode is enabled.

Also in accordance with the teachings herein, a method performed by an electronic device for contextually managing contact priorities based on travel includes determining a contact for an individual who is traveling with a user of the electronic device to a travel destination remote from a home location for the electronic device and temporarily making the contact a preferred contact while traveling. The method further includes enabling a limited-interruption mode on the electronic device while traveling, wherein an audible alert on the electronic device is enabled for preferred contacts and disabled for non-preferred contacts while the limited-interruption mode is enabled.

Additionally in accordance with the teachings herein is an electronic device configured to contextually manage contact priorities based on travel and having a processing element. The processing element is configured to determine a travel destination remote from a home location for the electronic device and determine a set of individuals that will be located at the travel destination. The processing element is further configured to temporarily make one or more contacts for the set of individuals preferred contacts while traveling and to enable a limited-interruption mode on the electronic device while traveling, wherein an audible alert on the electronic device is enabled for preferred contacts and disabled for non-preferred contacts while the limited-interruption mode is enabled.

In a further embodiment, the electronic device also includes at least one communication interface configured to exchange an electronic communication with another electronic device, wherein the processing element is operatively coupled to the at least one communication interface. The processing element is also configured to determine the travel destination and the set of individuals by parsing the electronic communication.

An electronic device, also referred to simply as a device, is any device configured for a limited-interruption mode. A limited-interruption mode is a state of operation that selectively suppresses audible alerts on the device that result from receiving electronic communications from individuals using other devices. In a first example, a device is in a limited-interruption mode while a user of the device is in a meeting and the device disables an audible chime that would otherwise play when the device receives a text message from another device. In a second example, a device is in a limited-interruption mode while a user of the device is sleeping and the device disables an audible ringtone that would otherwise play when the device receives a call from another device. In a third example, a device is in a limited-interruption mode when a user of the device manually enables the limited-interruption mode on the device. This stops the device from playing a voice notification over its speaker that would otherwise announce: "You received a new message from Mike. To listen, say 'listen.'" A non-exhaustive list of electronic devices consistent with described embodiments includes smartphones, smartwatches, phablets, tablets, laptops, personal digital assistants, enterprise digital assistants, and other portable devices configured to receive electronic communications.

A home location for a device is a primary geographical location at which a user of the device works and/or resides. A home location for a device is Chicago, for example, when its user works and resides within the city limits of Chicago. The home location for the device is the Chicago metropolitan area when the user works in the City of Chicago by commuting to and from his residence in a suburb of Chicago.

A device travels or is traveling when the device is taken by its user on a trip or journey to a travel destination which is remote from a home location for the device. For some embodiments, remote indicates a distance of several hundred miles or more. For example, a user takes his device with him on a trip from Chicago to Denver by bus. In other embodiments, remote indicates that a travel destination is greater than a day's travel time away from a home location, independent of a mode of travel. For example, the user takes his device with him on an organized four-day bicycle ride from Chicago to Mississippi Palisades State Park. In certain instances, traveling can involve multiple travel destinations. This is the case, for example, when a user visits numerous countries while touring Europe.

FIG. 1 shows an electronic device, specifically a smartphone 100, which is referred to in describing included embodiments. The smartphone 100 is shown with a number of components, namely: left 108 and right 110 stereo speakers; a camera 112, and a display 118. These components 108, 110, 112, 118 enable the smartphone 100 to function in accordance with described embodiments. In other embodiments, different electronic devices having similar components are used to perform the functionality described herein with respect to the smartphone 100. These electronic devices and their included components are represented by and described with reference to FIG. 2.

Figure 2:
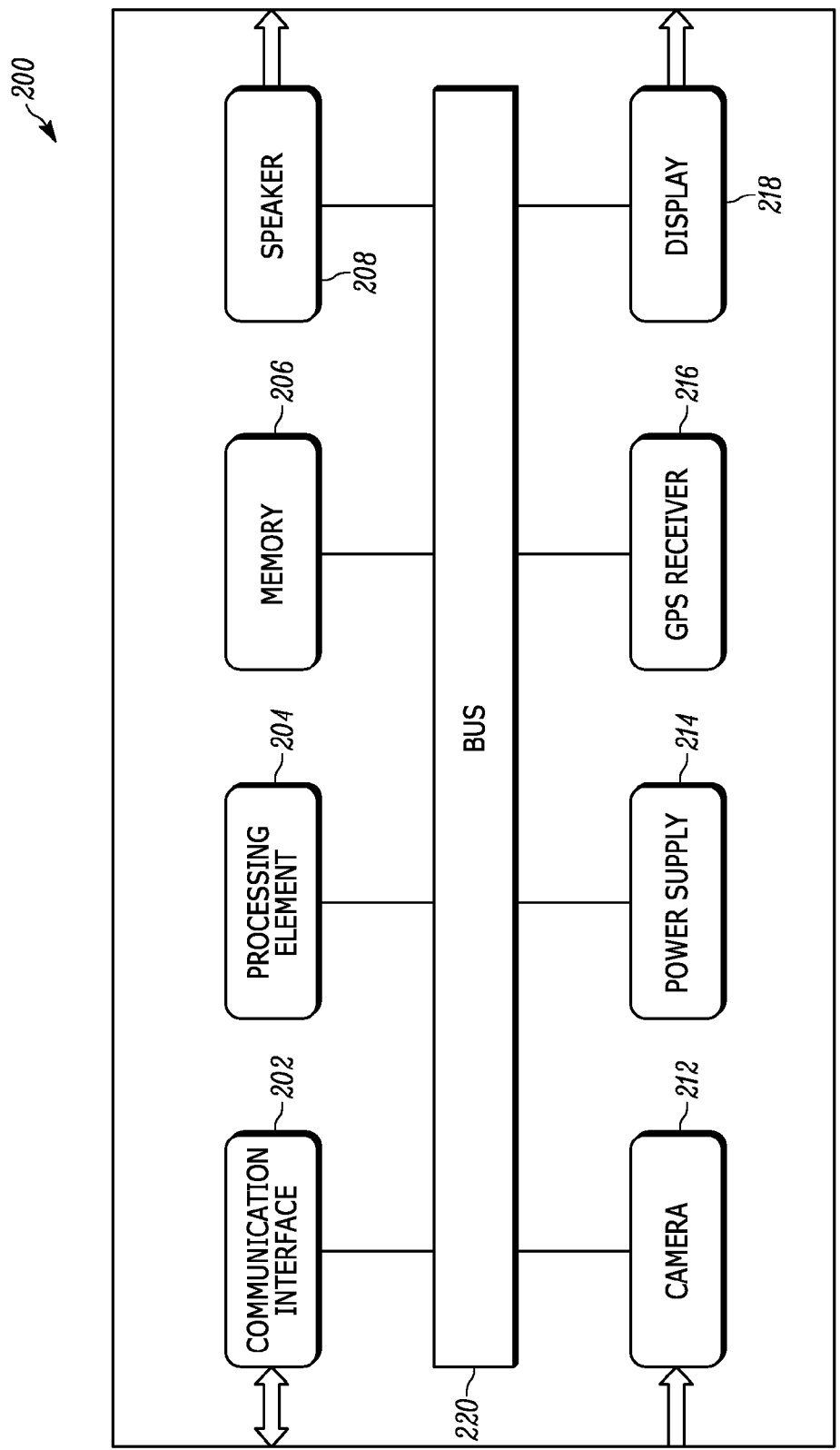
FIG. 2 shows a block diagram of an electronic computing device, in accordance with some embodiments.

FIG. 2 shows a block diagram of a nonspecific electronic device 200 in accordance with embodiments of the present teachings. For a particular embodiment, the electronic device 200 represents the smartphone 100. Included within the electronic device 200 are a communication interface 202, a processing element 204, memory 206, a speaker 208, a camera 212, a power supply 214, a global positioning system (GPS) receiver 216, and a display 218, which are all operationally interconnected by a bus 220.

A limited number of device components 202, 204, 206, 208, 212, 214, 216, 218, 220 are shown within the electronic device 200 for ease of illustration. Other embodiments may include a lesser or greater number of components in an electronic device. Moreover, other components needed for a commercial embodiment of an electronic device that incorporates the components 202, 204, 206, 208, 212, 214, 216, 218, 220 shown for the electronic device 200 are omitted from FIG. 2 for clarity in describing the enclosed embodiments.

The processing element 204, for instance, includes arithmetic logic and control circuitry necessary to perform the digital processing, in whole or in part, for the electronic device 200 to determine that a set of individuals will be located at a travel destination and to perform functionality in accordance with described embodiments for the present teachings. For one embodiment, the processing element 204 represents a primary microprocessor, also referred to as a central processing unit (CPU), of the electronic device 200. For example, the processing element 204 can represent an application processor of a tablet. In another embodiment, the processing element 204 is an ancillary processor, separate from the CPU, wherein the ancillary processor is dedicated to providing the processing capability, in whole or in part, needed for the components 202, 204, 206, 208, 212, 214, 216, 218, 220 of the electronic device 200 to perform at least some of their intended functionality.

The memory 206 provides storage of electronic data used by the processing element 204 in performing its functionality. For example, the processing element 204 can use the memory 206 to load programs and/or store files associated with determining that a set of individuals will be located at a travel destination and enabling a limited-interruption mode. In one embodiment, the memory 206 represents random access memory (RAM). In other embodiments, the memory 206 represents volatile or non-volatile memory. For a particular embodiment, a portion of the memory 206 is removable. For example, the processing element 204 can use RAM to cache data while it uses a micro secure digital (microSD) card to store files associated with functionality performed in conjunction with a limited-interruption mode.

One or more communication interfaces 202 allow for communication between the electronic device 200 and other electronic devices, such as smartphones or laptops, configured to interact with the electronic device 200 as part of the electronic device 200 performing its described functionality. These other devices, for example, can initiate a phone-to-phone, a computer-to-phone, a phone-to-computer, or a computer-to-computer call to the electronic device 200. The electronic device 200 can also receive text messages, e-mails, and additional electronic communications from other devices.

For one embodiment, the communication interface 202 includes a cellular transceiver to enable the electronic device 200 to receive calls and/or messages from other electronic devices using one or more cellular networks. Cellular networks can use any wireless technology that, for example, enables broadband and Internet Protocol (IP) communications including, but not limited to: $3^{rd}$ Generation (3G) wireless technologies such as CDMA2000 and Universal Mobile Telecommunications System (UMTS) networks; $4^{th}$ Generation (4G) technologies such as LTE and WiMAX; or $5^{th}$ Generation (5G) technologies.

In another embodiment, the communication interface 202 includes a wireless local area network (WLAN) transceiver that allows the electronic device 200 to access the Internet using standards such as Wi-Fi. The WLAN transceiver allows the electronic device 200 to receive radio signals from similarly equipped electronic devices using a wireless distribution method, such as a spread-spectrum or orthogonal frequency-division multiplexing (OFDM) method. For some embodiments, the WLAN transceiver uses an IEEE 802.11 standard to communicate with other electronic devices in the 2.4, 3.6, 5, and 60 GHz frequency bands. In a particular embodiment, the WLAN transceiver uses Wi-Fi interoperability standards as specified by the Wi-Fi Alliance to communicate with other Wi-Fi certified devices.

The GPS receiver 216 is configured to detect where the device 200 is located. For some embodiments, the device 200 determines that it is traveling based on the location of the device 200. The device 200 being located at an international airport, for example, can serve as an indication that the device 200 is about to travel, especially if the time the device 200 is at the airport coincides with a travel time indicated by a calendar application or a travel itinerary. In a further example, the GPS receiver 216 determining that the device 200 is located in the Atlantic Ocean serves as an indication that the device 200 is traveling by aircraft or ship. The device 200 being located in Paris when its home location is Chicago also serves as an indication that the device 200 is traveling. In another example, a speed of the device 200 moving over land, determined from the device's change in location with respect to time, indicates the device 200 is traveling by aircraft or high-speed rail.

The camera 212 is an input device that captures images of the device's surroundings. The device 200 then processes the captured images, using the processing element 204, for an indication that the device 200 is traveling. In some instances, the device 200 identifies specific landmarks in captured images. A captured image is compared against a database of reference images, for example, to determine if an identifiable landmark is present in the captured image. Identifying the Eiffel Tower in a captured image indicates the device 200 is traveling in Paris. Identifying the Colosseum in a captured image indicates the device 200 is traveling in Rome.

In other instances, the device 200 identifies general settings from captured images which indicate that the device 200 is traveling. In a first example, the device 200 determines from a captured image that it is located in the cabin of a passenger airliner. In a second example, the device 200 determines that signage captured in multiple images taken over a span of time or distance is consistently written in a foreign language. The signs being in German would indicate that the device 200 is traveling in Germany.

The speaker 208 and the display 218 are output components of the electronic device 200 that allow the device 200 to interface with a user. In particular, the display 218 and the speaker 208 generate alerts designed to notify the user of incoming calls, messages, or a current status of the device 200. The speaker 208, for example, generates an audible alert in the form of a ringtone to notify the user of an incoming call. The device 200 can also use the speaker 208 to play different audible alerts for different types of messages. An incoming text message, for example, might be accompanied by a default chime, whereas an incoming e-mail is accompanied by a user-selected tone. The display 218 also generates visual alerts in the form of pop-up message windows, for instance, to notify the user of an incoming communication. Visual alerts can notify the user of an incoming communication when audible alerts are silenced while a limited interruption mode is enabled on the device 200.

The power supply 214 represents a power source that supplies electric power to the device components 202, 204, 206, 208, 212, 216, 218, and 220, as needed, during the course of their normal operation. The power is supplied to meet the individual voltage and load requirements of the device components 202, 204, 206, 208, 212, 216, 218, 220 that draw electric current. For some embodiments, the power supply 214 is a wired power supply that provides direct current from alternating current using a full- or half-wave rectifier. For other embodiments, the power supply 214 is a battery that powers up and runs a portable electronic device. For a particular embodiment, the battery 214 is a rechargeable power source. A rechargeable power source for an electronic device is configured to be temporarily connected to another power source external to the electronic device to restore a charge of the rechargeable power source when it is depleted or less than fully charged. In another embodiment, the battery is simply replaced when it no longer holds sufficient charge.

Figure 3:
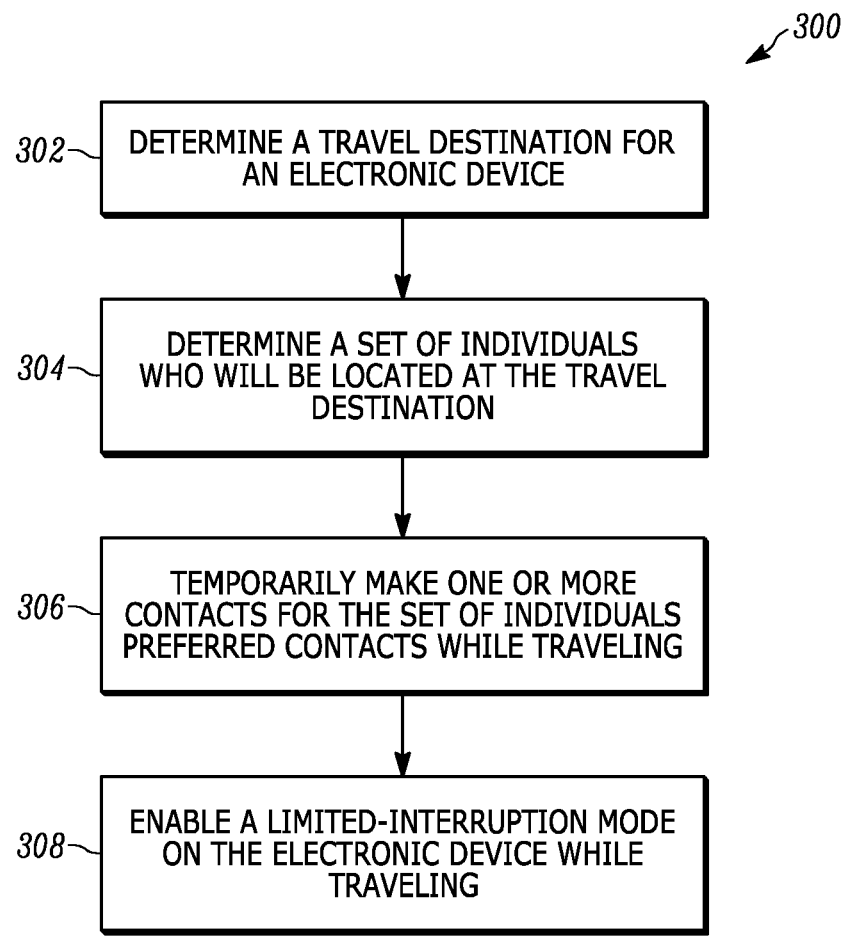
FIG. 3 shows a logical flow diagram illustrating a method for managing contact information based on travel, in accordance with some embodiments.

With reference to the remaining figures, a detailed description of the functionality of the components shown in FIGS. 1 and 2 is given. FIG. 3 shows a logical flow diagram illustrating a method 300 performed by an electronic device, taken to be the smartphone 100, to manage contact priorities based on travel. The smartphone 100 is also referred to as a first device 100 and the user of the smartphone 100 is referred to as a first user. The users of the other devices are referred to as individuals.

The method 300 begins with the first device 100 determining 302 a travel destination. The first device 100 also determines 304 a set of individuals who will be located at the travel destination. The set of individuals can include multiple individuals or only a single individual. Further, the set of individuals can include, in any combination, individuals traveling with the first user to the travel destination, individuals traveling separately from the first user to the travel destination, and/or individuals already located at the travel destination. The travel destination and the set of individuals who will be located at the travel destination are described in greater detail with reference to FIG. 4.

Figure 4:
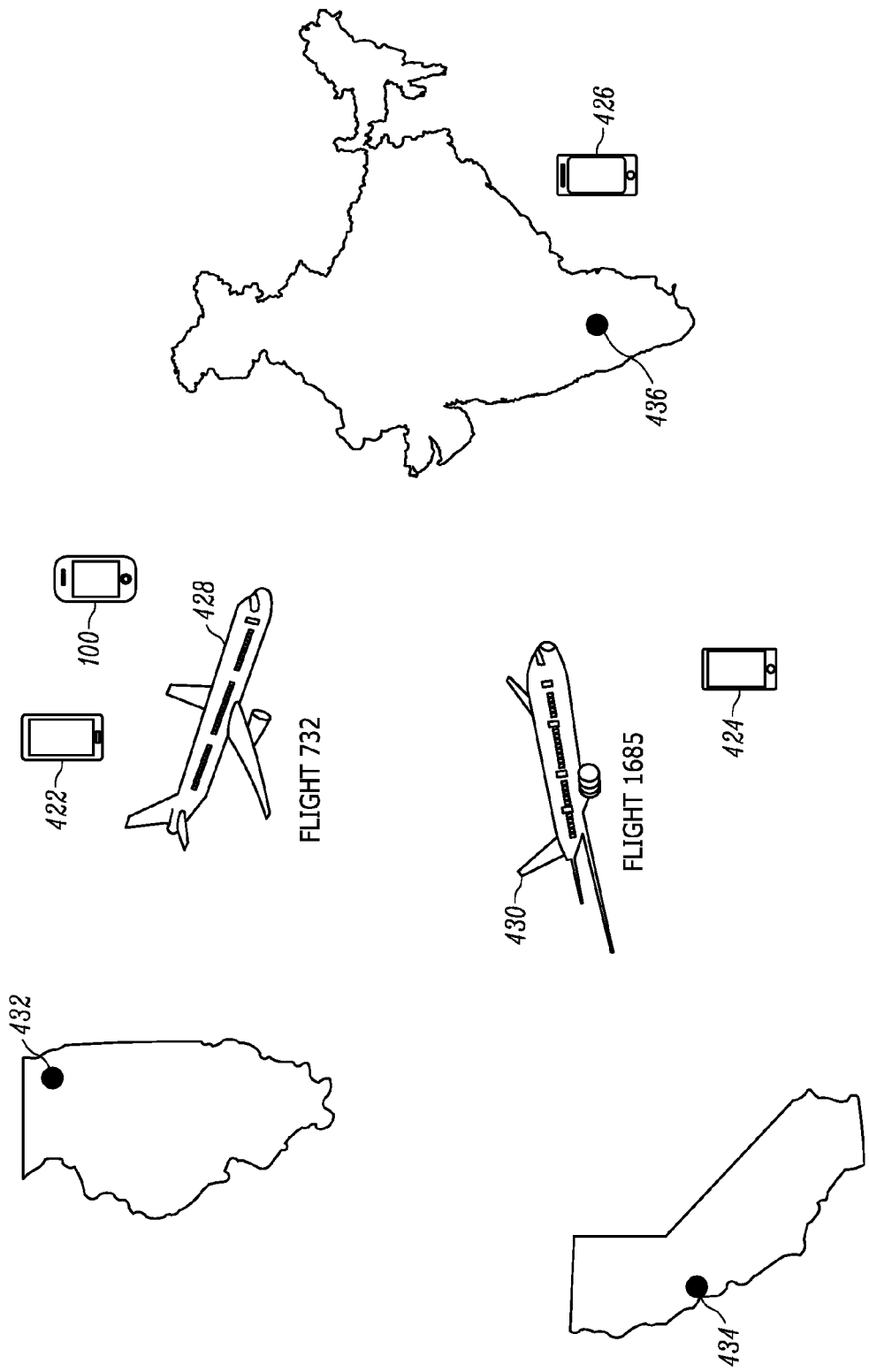
FIG. 4 shows a schematic diagram for managing contact information based on travel, in accordance with some embodiments.

FIG. 4 shows a passenger airliner 428, designated as flight 732, in route from Chicago 432, Illinois to Bangalore 436, India. Aboard flight 428, the first user is traveling with the first device 100, and a second individual has a second device 422. FIG. 4 also shows a passenger airliner 430, designated as flight 1685, in route from San Francisco 434, California to Bangalore 436. Aboard flight 1685, a third individual has a third device 424. A forth device 426 belonging to a fourth individual is additionally shown in Bangalore 436.

In one embodiment, the second, third, and fourth individuals represent the set of individuals who will be located at the travel destination, which in this case is Bangalore. The first user, for example, is an employee with Western Electrodynamics Corporation, which has its national headquarters in Chicago 432. The first user is traveling with the second individual, a coworker at Western Electrodynamics, to meet with the fourth individual, who is a potential customer already located in Bangalore 436. The third individual, also an employee of Western Electrodynamics, is traveling separately from a manufacturing facility located in San Francisco 434.

In alternate embodiments, the fourth individual is a Western Electrodynamics employee who arrived in Bangalore 436 ahead of the others, or the fourth individual is a personal friend of the first user living in Bangalore 436. In another embodiment, the first user, the second individual, and the third individual are social acquaintances. For example, they are college friends visiting the fourth individual, who is their former classmate and who returned to Bangalore 436 after studying abroad.

In some instances, the first electronic device 100 determines the travel destination and the set of individuals who will be located at the travel destination by parsing one or more electronic communications, also referred to simply as communications. These electronic communications can include electronic-mail communications (e-mails), electronic-chat communications (chats), and/or a text message communications (texts). Further, the electronic communications can be incoming electronic communications received from another device, outgoing electronic communications sent to another device, or any combination thereof.

For one embodiment, the first device 100 receives an e-mail from a travel agency that includes a travel itinerary.

The first device 100 parses the e-mail, by identifying key words and using contextual filters, for instance, to determine from the travel itinerary that the first user will be vacationing for three weeks. Specifically, the travel itinerary indicates the first user will arrive in Bangalore 436 aboard flight 732 at 10:30 a.m. local time on October 23. In a further embodiment, the first device 100 determines from multiple e-mails sent to and received from the forth device 426 that the fourth individual resides in Bangalore 436 or that the fourth individual will be in Bangalore 436 while the first user is in Bangalore 436.

For another embodiment, the first device 100 receives and parses one or more texts to determine the travel destination and the set of individuals who will be located at the travel destination. For example, the first device 100 receives a text from the second device 422 indicating that the second individual booked a trip for both the second individual and the first user to Bangalore 436. In a further embodiment, the second device 422 sends a group text to the first device 100, the third device 424, and the fourth device 426. From parsing the group text, the first device 100 determines that the first user and the second individual will be traveling to Bangalore 436 aboard the same flight, that the third individual will be traveling to Bangalore 436 separately aboard a different flight, and that the fourth individual will be waiting to meet the first user, the second individual, and the third individual at the airport in Bangalore 436.

The first electronic device 100 can also determine the travel destination and the set of individuals who will be located at the travel destination by parsing social media content. The first user, for example, is listed as a friend on the third individual's Facebook account. The third individual posts details of his upcoming trip to Bangalore 436 on his Facebook page, which the first device 100 accesses and parses to determine that the third individual will be in Banaglore 436 during a time the first user will also be in Bangalore 436. In another example, the first user and the second individual are LinkedIn contacts of the third user. With the aid of a messaging feature integrated into LinkedIn, the third individual uses the third device 424 to establish one or more chat sessions with the first 100 and second 422 devices indicating that third individual will also be traveling to Bangalore 436.

In other embodiments, the first device 100 determines the travel destination and the set of individuals who will be located at the travel destination by parsing multiple e-mails, chats, texts, and/or social media content in different combinations. The first device 100, for example, determines the first user is traveling to Bangalore 436 from an itinerary e-mailed to the first device 100 by a travel agency. The first device 100 additionally determines the second individual will be traveling with the first user to Bangalore 436 from a text message received from the second device 422. From parsing the third individual's Facebook page, the first device 100 determines the third user is also traveling to Bangalore 436 during the same time period. For a further embodiment, the first device 100 additionally determines the fourth individual will already be in Bangalore 436 when the first user arrives. The first device 100 determines this, for example, by using speech-to-text functionality to parse a voice call between the first device 100 and the fourth device 426.

For an embodiment, the first electronic device 100 determines the travel destination and the set of individuals who will be located at the travel destination by parsing a travel itinerary hosted by an electronic device, such as a server, maintained by a business entity. This is the case, for instance, when the first user and the set of individuals are traveling as representatives of a common business entity, such as Western Electrodynamics. The first device 100 interfaces or communicatively couples with one of Western Electrodynamics' corporate servers to determine that the first user and the second individual, both from the same department, will fly to Bangalore 436 together to survey a proposed site for a fabrication facility. The first device 100 also determines that the third individual will be flying to Bangalore 436 separately from Western Electrodynamics' San Francisco 434 office.

For some embodiments, the first device 100 determines the travel destination and the set of individuals who will be located at the travel destination by accessing a calendar application. The calendar application can be executing on the first device 100 and/or on another electronic device communicatively coupled to the first device 100. For example, the first user installs a mobile calendar application, such as Microsoft Outlook, onto the first device 100 and enters into the calendar application a scheduled trip to Bangalore 436. In another embodiment, the first user enters the scheduled trip into a primary calendar application executing on another electronic device, such as the first user's home or work computer, with which the mobile calendar application periodically synchronizes data.

In one example, Western Electrodynamics, the employer of the first user and the second individual, sets up an exchange server to support online client calendar applications accessible to the first 100 and second 422 devices through Internet connections. Schedule information is shared between a first client calendar application, associated with the first user, and a second client calendar application, associated with the second individual. By accessing the first client calendar application, the first device 100 determines that the second individual will be traveling to Bangalore 436 with the first user on a particular day and returning a month later. For an alternate embodiment, the first 100 and second 422 devices each execute or synchronize with shared calendar applications which directly exchange data without using an exchange server. For instance, the first device 100 has access to a group calendar from which it determines a set of individuals who will be traveling with the first user to a travel destination.

In an embodiment, when the first device 100 determines an individual will be located at the travel destination for the first device 100, the first device 100 presents a notification to the first user indicating the individual is traveling with the first user to the travel destination. This informs the first user he is not traveling alone. A week before his Bangalore 436 trip, for example, the first user receives a notification from the first device 100 informing him that a coworker will be accompanying him to Bangalore 436. This allows the first user to contact the coworker before the trip to plan out specific aspects of the trip. In different embodiments, the first device 100 can present the notification as an e-mail sent to an e-mail account for the first user, as a text message, on the display 118, over the speakers 108, 110, and/or as a post to a business-related or a social media account for the first user.

Returning to FIG. 3, the method 300 continues with the first device 100 temporarily making 306 one or more contacts for the set of individuals preferred contacts while the first device 100, and therefore also the first user, is traveling. A contact is a collection of one or more contact records, also referred to simply as records, which specify contact information for an individual. Each contact record includes information identifying an electronic means for the individual to communicate with the first device 100 using another electronic device and/or an electronic account. A contact is described in greater detail with reference to FIG. 5.

FIG. 5 shows a contact 500 stored on the first device 100 for an individual Steven Parker in accordance with a particular embodiment. The contact 500 is arranged into three columns 502, 504, 506, with each column representing grouped fields. The contact entry 500 is also arranged into seven rows 522, 532, 542, 552, 562, 572, 582, with each row representing a contact record. For some embodiments, the contact 500, shown as a seven-by-three array, is a view of a larger contacts table which includes additional records for other contacts.

The first column 502 of the contact 500 represents contact-identification (ID) fields. The contact-ID fields, which include the fields 524, 534, 544, 554, 564, 574, and 584, store a unique number for each contact and identify records associated with the contact 500. The contact-ID field for each record of the contact 500 stores the numeric string "3822," identifying the seven records 522, 532, 542, 552, 562, 572, 582 as being for the individual Steven Parker. Although in this example the contact-ID values are numbers, different implementations may use different values, strings, or other types of identifiers to link records that relate to the same contact.

The second column 504 of the contact 500 represents type fields 526, 536, 546, 556, 566, 576, 586 that specify a type of record stored for the contact. For example, text stored in the type field 536 identifies the record 532 as being for a personal phone number, and text stored in the type field 546 identifies the record 542 as being for a work phone number. Similarly, text stored in the type field 556 identifies the record 552 as being for a personal e-mail address, and text stored in the type field 566 identifies the record 562 as being for a work e-mail address.

The third column 506 of the contact 500 represents data value fields 528, 538, 548, 558, 568, 578, 588. The data value fields store the actual data used by the first device 100 to establish an electronic connection with an individual or to determine the electronic means by which the individual is establishing an electronic connection with the first device 100. The data value fields 528, 538, 548, 558, and 568, for instance, are populated with Steven Parker's personal home number, personal cell number, work phone number, personal e-mail address, and work e-mail address, respectively. When the first device 100 receives a call from the number (415) 473-8129, the first device 100 determines from the record 532 of the contact 500 that Steven Parker is calling using his personal cell phone. When the first device 100 receives an e-mail using the address parker.s@eletrodynamics.com, the first device 100 determines from the record 562 of the contact 500 that Steven Parker is sending the e-mail using his work e-mail account.

A preferred contact is defined relative to a contact that does not have preferred status. For a preferred contact, an electronic communication received by the first device 100 from another device or account used by the individual associated with the preferred contact results in an audible alert being played on the first device 100 while a limited-interruption mode is enabled on the first device 100. An electronic communication received from an individual not associated with a preferred contact does not result in an audible alert being played on the first device 100 while the limited-interruption mode is enabled on the first device 100.

For an embodiment, an audible alert on the first device 100 includes at least one of a first sound played by the first device 100 when receiving a call or a second sound played by the first device 100 when receiving a text message. The first sound, for example, is music selected by the first user whereas the second sound is an unrelated sound effect. In further embodiments, the first device 100 plays similar or dissimilar sounds in any combination for different types of electronic communications the first device 100 receives.

An individual associated with a preferred contact, referred to as a preferred individual, can reach the first user on the first device 100 while the first device 100 is in a limited-interruption mode. This is because the first device 100 still plays audible alerts for some or all electronic communications received from the preferred individual. Not taking visual alerts into account, an individual not associated with a preferred contact, referred to as a non-preferred individual, cannot reach the first user on the first device 100 while the first device 100 is in a limited-interruption mode. The first device 100 suppresses audible alerts for electronic communications received from non-preferred individuals.

Returning again to FIG. 3, the method 300 continues with the first device 100 enabling 308 a limited-interruption mode while the first user is traveling with the first device 100. For an embodiment, the limited-interruption mode is a sleeping mode or a meeting mode. In the sleeping mode, suppressing audible alerts for incoming communications from non-preferred individuals keeps the first device 100 from disturbing the first user while he is sleeping. For one embodiment, the first user manually enables the sleeping mode on the first device 100 before he goes to sleep. For another embodiment, the first device 100 determines the first user is sleeping and automatically enables the sleeping mode without input from the first user. The first device 100 determines the first user is sleeping, for example, by detecting the first user is motionless and/or snoring.

In the meeting mode, suppressing audible alerts for incoming communications from non-preferred individuals keeps the first device 100 from disturbing the first user while he is in a meeting. For one embodiment, the first user manually enables the meeting mode on the first device 100 as the meeting begins. For another embodiment, the first device 100 determines the meeting has begun and automatically enables the meeting mode without input from the first user. The first device 100 determines the meeting has begun, for example, from a scheduled meeting time and/or from the first device 100, or a communicatively coupled device used by the first user, executing meeting software or detecting that the first user is at a meeting location.

In some cases, a contact already exists on the first device 100 for an individual who will be located at the travel destination to which the first user is traveling. For such cases, the first device 100 temporarily making a contact a preferred contact includes temporarily making the preexisting non-preferred contact on the first electronic device 100 a preferred contact. In an embodiment, the first device 100 reverts the preferred contact back to the preexisting non-preferred contact when returning to the home location for the first device 100. For example, the contact 500 for Steven Parker already exists on the first device 100 when the first device 100 determines that Steven Parker will be traveling with the first user to India. The first device 100 makes the contact 500 a preferred contact during the India trip and reverts the preferred contact back to the non-preferred contact 500 when the trip is concluded.

In other cases, a contact does not exist on the first device 100 for an individual who will be located at the travel destination to which the first user is traveling. For such instances, the first device 100 temporarily making a contact a preferred contact includes temporarily creating a contact as a preferred contact on the first device 100. In an embodiment, the first device 100 deletes the preferred contact when returning to the home location for the first device 100. For instance, the first device 100 determines from a travel itinerary that Heather Benz will be traveling with the first user to India, but the first device 100 does not have a contact stored for her. The first device 100 creates a contact for Heather Benz, when the India trip begins, using contact information included in the travel itinerary or accessible from one or more databases with which the first device 100 can electronically connect. When the trip ends, the first device 100 deletes the contact for Heather Benz because the contact was not initially programmed into the first device 100.

In another example, the first device 100 determines three weeks prior to the India trip that Heather Benz will be traveling with the first user. The first device 100 responsively creates a non-preferred contact for Heather Benz. However, in three weeks time when the trip begins, the first device 100 makes the non-preferred contact for Heather Benz a preferred contact. Upon concluding the trip, the first device 100 deletes the contact for Heather Benz.

In the previous examples, Steven Parker and Heather Benz were individuals traveling with the first user to India. For some embodiments, at least one individual of the set of individuals who will be located at the travel destination for the first device 100 will be traveling with the first user to the travel destination. Steven Parker or Heather Benz, for example, represent the second individual traveling with the second device 422 shown in FIG. 4. For another embodiment, a contact is temporarily made a preferred contact for an individual whose home location is the travel destination. For instance, Raj Kumar, the fourth individual using the fourth device 426 shown in FIG. 4, is a friend of the first user living in India.

Two examples illustrate benefits of the present teachings. In a first example, the first user, Bob Smith, travels with Steven Parker to India. On the day of their scheduled departure from India to return home, Steven arrives at the airport to find Bob is not there. Bob, still being unaccustomed to the time difference, has overslept. Steven tries to reach Bob by calling and texting Bob's smartphone 100. Because Bob is still sleeping, Bob's smartphone 100 is in a sleeping mode and silences all the audible alerts associated with Steven trying to contact Bob. Implementing the present teachings, the contact 500 for Steven becomes a preferred contact while Steven and Bob are traveling together. Therefore, Steven's call to Bob rings through on Bob's smartphone 100, preventing Bob from missing his flight.

In a second example, the first user, Bob Smith, travels to India with coworkers Steven Parker and Heather Benz. While Bob is looking for a place to have lunch, local authorities ask Bob for his passport. Bob, however, has left his passport behind in an office building where Steven and Heather are currently in a meeting. Bob calls and texts Steven and Heather, but because Steven's smartphone 422 and Heather's smartphone 424 are both in a meeting mode, Bob is unable to reach either Steven or Heather. Implementing the present teachings, the contact for Bob is made a preferred contact on Steven's smartphone 422 and Heather's smartphone 424 while Steven, Heather, and Bob are traveling together. Therefore, Bob's calls to Steven and Heather ring through, allowing either Steven or Heather to promptly deliver Bob's passport to him.

For two or more people traveling together, being able to reach each other while traveling is important. This is generally true even when the people are not close friends or family members. By making contacts for traveling companions preferred contacts on electronic devices, the users of the electronic devices make themselves more accessible to one another while they are traveling together.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method performed by a first electronic device for contextually managing contact priorities based on travel, the method comprising:
   determining a travel destination remote from a home location for the first electronic device;
   determining a set of individuals who will be located at the travel destination by parsing one or more of the following information at the first electronic device: electronic communications, social media, travel itinerary, or calendar;
   temporarily making one or more contacts for the set of individuals preferred contacts while traveling; and
   enabling a limited-interruption mode on the first electronic device while traveling, wherein an audible alert on the first electronic device is enabled for preferred contacts and disabled for non-preferred contacts while the limited-interruption mode is enabled, wherein non-preferred contacts are contacts that are not associated with preferred contacts.

2. The method of claim 1, wherein the audible alert on the first electronic device comprises at least one of:
   a first sound played by the first electronic device when receiving a call; or
   a second sound played by the first electronic device when receiving a text message.

3. The method of claim 1, wherein the limited-interruption mode comprises one of:
   a sleeping mode;
   or a meeting mode.

4. The method of claim 1, wherein temporarily making a contact a preferred contact comprises temporarily making a first preexisting non-preferred contact on the first electronic device a first preferred contact.

5. The method of claim 4 further comprising reverting the first preferred contact back to the first preexisting non-preferred contact when returning to the home location for the first electronic device.

6. The method of claim 1, wherein temporarily making a contact a preferred contact comprises temporarily creating a first contact as a first preferred contact on the first electronic device.

7. The method of claim 6 further comprising deleting the first preferred contact when returning to the home location for the first electronic device.

8. The method of claim 1, wherein the one or more contacts comprises contacts for at least one individual of the set of individuals whose home location is the travel destination.

9. The method of claim 1, wherein the one or more contacts comprises contacts for at least one individual of the set of individuals who will be traveling with a first user of the first electronic device to the travel destination.

10. The method of claim 1, wherein the first electronic device determines the travel destination and the set of individuals who will be located at the travel destination by parsing one or more electronic communications.

11. The method of claim 10, wherein the one or more electronic communications comprise at least of:
   an electronic-mail communication;
   an electronic-chat communication; or
   a text-message communication.

12. The method of claim 11, wherein the one or more electronic communications comprise at least one of:
   an incoming electronic communication received by the first electronic device from a second electronic device; or
   an outgoing electronic communication sent by the first electronic device to the second electronic device.

13. The method of claim 1, wherein the first electronic device determines the travel destination and the set of individuals who will be located at the travel destination by accessing a calendar application.

14. A method performed by a first electronic device for contextually managing contact priorities based on travel, the method comprising: determining a contact for an individual who is traveling with a first user of the first electronic device to a travel destination remote from a home location for the first electronic device, by parsing one or more of the following information at the first electronic device: electronic communications, social media, travel itinerary, or calendar; temporarily making the contact a preferred contact while traveling; and enabling a limited-interruption mode on the first electronic device while traveling, wherein an audible alert on the first electronic device is enabled for preferred contacts and disabled for non-preferred contacts while the limited-interruption mode is enabled, wherein non-preferred contacts are contacts that are not associated with preferred contacts.

15. The method of claim 14, wherein the individual and the first user are traveling as representatives of a common business entity.

16. The method of claim 15, wherein the first electronic device determines the travel destination and the individual by parsing a travel itinerary hosted by a second electronic device maintained by the business entity.

17. The method of claim 14, wherein the first electronic device determines the travel destination and the individual by parsing social media content.

18. The method of claim 14 further comprising presenting a notification indicating the individual is traveling with the first user to the travel destination.

19. A first electronic device configured to contextually manage contact priorities based on travel, the first electronic device comprising:
a processing element configured to:
- determine a travel destination remote from a home location for the first electronic device;
- determine a set of individuals that will be located at the travel destination, by parsing one or more of the following information at the first electronic device: electronic communications, social media, travel itinerary, or calendar;
- temporarily make one or more contacts for the set of individuals preferred contacts while traveling; and
- enable a limited-interruption mode on the first electronic device while traveling, wherein an audible alert on the first electronic device is enabled for preferred contacts and disabled for non-preferred contacts while the limited-interruption mode is enabled, wherein non-preferred contacts are contacts that are not associated with preferred contacts.

20. The first electronic device of claim 18 further comprising at least one communication interface configured to exchange an electronic communication with a second electronic device, wherein the processing element is operatively coupled to the at least one communication interface, and wherein the processing element is further configured to determine the travel destination and the set of individuals by parsing the electronic communication.

* * * * *